Patented Oct. 26, 1926.

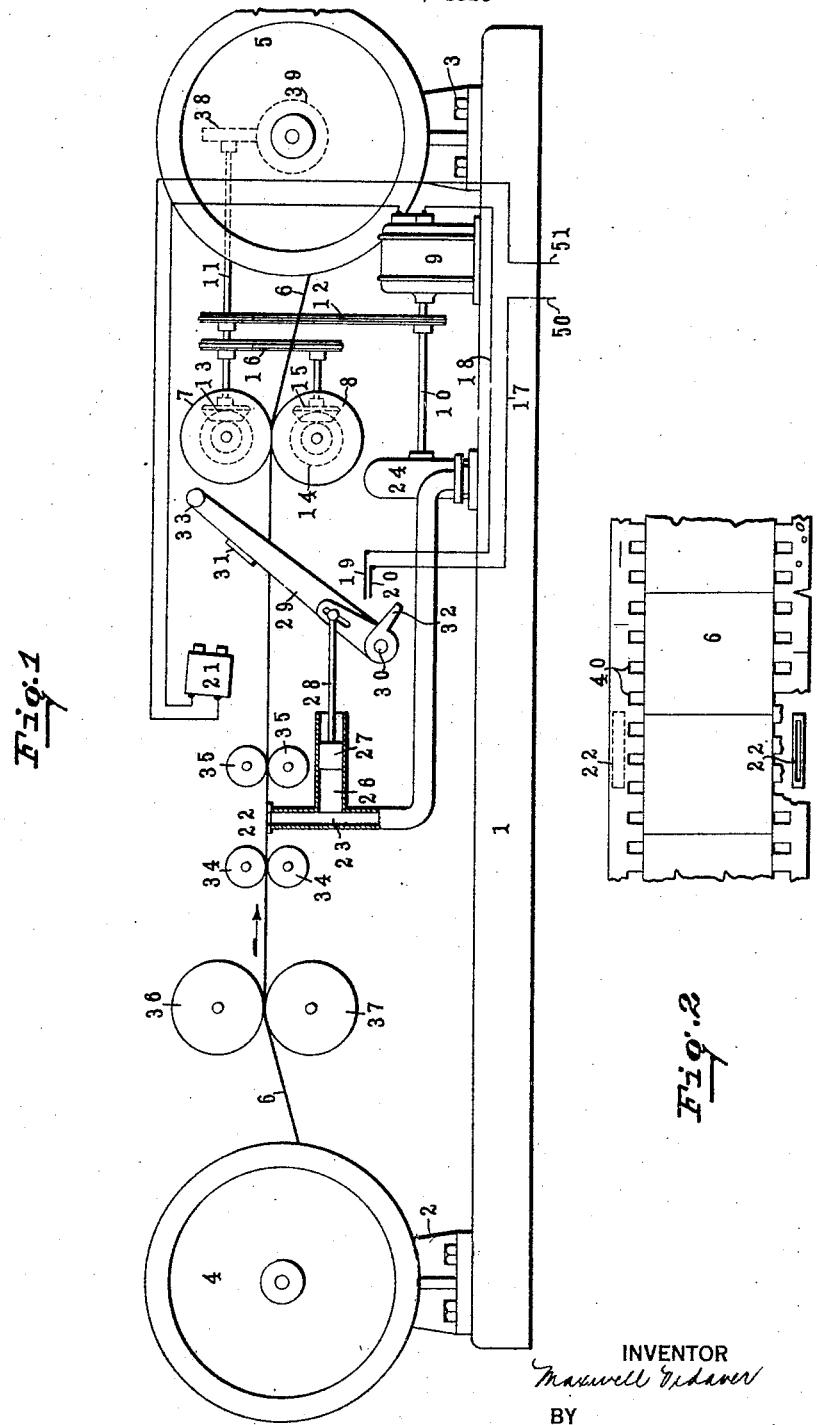

1,604,138

UNITED STATES PATENT OFFICE.

MAXWELL VIDAVER, OF NEW YORK, N. Y., ASSIGNOR TO FILM INSPECTION MACHINE COMPANY, INC., OF NEW YORK, N. Y., A CORPORATION OF DELAWARE.

TESTING INSTRUMENT.

Application filed March 13, 1923. Serial No. 624,778.

This invention relates to testing instruments and with respect to its more specific features to instruments for testing moving picture films for defects such as abnormal apertures, slits, and the like.

One of the objects of the invention is the provision of a simple instrument for detecting small apertures, fine slits, and other similar defective features of the strip.

Another object of the invention is the provision of a testing instrument in which the direct testing instrumentality is of such a character as to minimize chance of injury to the strip.

The invention accordingly comprises the features of construction combination of elements, and arrangement of parts, which will be exemplified in the construction hereinafter set forth and the scope of the application of which will be indicated in the claims.

In the accompanying drawing forming part of this specification and wherein similar reference characters refer to similar parts throughout the several views, Figure 1 is a side elevation illustrating an embodiment of the invention, the illustration being largely diagrammatic; and Fig. 2 is a plan of a detail showing a strip and the relation of the defective feature detector in contact therewith.

Referring now more specifically to the drawing, there is illustrated a base 1 having standards 2 and 3, supporting casings 4 and 5. In the casing 4 is a supply reel from which the moving picture film or strip 6 proceeds, the casing 5 containing a takeup reel on which the strip 6 is to be wound. The testing instrumentality is located between the casings 4 and 5. The strip feeding mechanism includes a pair of cooperating friction rolls 7 and 8 driven from the electric motor 9 through any suitable form of operating gear. As illustrated, the shaft 10 of the electric motor drives the shaft 11 through the belt or chain 12, the shaft 11 in turn driving the upper feed roll 7 through the bevel gears 13 and driving the lower feed roll 8 through the bevel gears 14 and 15 and the belt or chain 16. The feed rolls 7 and 8 will be supported in suitable bearings of a standard (not shown) rising from the base 1. The numerals 17 and 18 indicate the circuit for the electric motor, the wires of the circuit terminating in normally open terminals 19 and 20 which latter may be moved into contact one with the other so as to close the circuit. The numeral 21 indicates an electro-magnet in series in the motor circuit and consequently adapted to be energized and deenergized as the terminals 19 and 20 are in closed or open relation.

At 22 is indicated a pneumatic detector adapted to cooperate with the strip 6. The numeral 23 indicates a chamber in open communication with the pneumatic pump 24. The detector 22 is a port of the chamber 23 and the strip 6 is adapted to make sealing contact with said port. To facilitate such contact the edges of the port may be of a yielding character as would be provided, for instance, by a ring or other shaped piece of rubber or similar material as shown in Fig. 2. The port is elongated and rectangular in shape.

A pump may be actuated from the motor 9 to cause air from the atmosphere to pass into the detecting port 22 toward the pump or to pass in the opposite direction and out of the detecting port 22. As illustrated, the pump 24 is of the centrifugal type and is adapted to draw air from the atmosphere through the port 22. However, when said port is covered and sealed by an imperforate portion of the strip 6 a partial vacuum is produced in the chamber 23 when the pump 24 operates. When an aperture in the strip registers with the port 22 this vacuum is relieved and the pressure in the chamber 23 rises.

Communicating with the chamber 23, and in effect forming a part thereof, is the cylinder 26 in which the piston 27 may reciprocate the inner face of the piston 27 being open to the pressure in the chamber 23. The piston 27 forms a part of a strip feed controlling mechanism being connected through rod 28 to an arm 29 pivoted at 30 to a standard (not shown) upstanding from the bed 1, said arm having an armature 31 adapted to cooperate with the magnet 21 and having a dog 32 adapted to cooperate to close the motor circuit through the terminals 19 and 20 by pressing one of these terminals into contact with the other, these terminals either alone or together with the arm 29 providing a switch adapted to open and close the motor circuit. The arm 29 is provided with a handle 33 for its manual actuation.

The strip 6 may be guided in close contact with the detecting port 22 by two pairs of rolls 34 and 35 on opposite sides, respectively, of the port 22. The numerals 36 and 37 indicate strip supporting and guiding rolls which may be idle or may be positively driven by suitable operating connections from the motor 9.

To use the instrument a reel of film to be tested is disposed in the casing 4 and the film passed between the supporting rolls 36 and 37 through the pairs of rolls 34 and 35 and between the feed rolls 7 and 8, the free end of the strip being attached to a reel enclosed in the casing 5. This latter reel is positively driven from the motor 9 through the shaft 11 and the worm gearing indicated in dotted lines by the numerals 38 and 39, the gear 39 being operatively coupled to drive the shaft of the takeup reel as by a friction clutch (not shown). The detecting port 22 will be disposed within the edge of the strip to be tested and out of alignment with the normal feed apertures 40 of the strip 6. Thereupon the handle 33 is grasped and the arm 29 rotated on its pivot 30 in a counter-clockwise direction (Fig. 1). This movement will cause the dog 32 to bring the terminals 19 and 20 into contact with each other so as to close the motor circuit. Simultaneously the electro-magnet 21 will be energized and will hold the armature 31 when the arm 29 has been moved sufficiently to bring said armature into contact with the magnet.

The operation of the motor will actuate the feed rolls 7 and 8 to feed the strip, drawing the latter from the supply reel, and winding it up upon the takeup reel. The strip will make close sealing contact with the detector port 22 as it travels from one reel to the other. The pump 24 will be operated and a partial vacuum will be produced in the chamber 23 when an imperforate portion of the strip 6 is in registry with the detecting port 22. The movement of the arm 29 above referred to will dispose the piston 27 to the left of the position illustrated in Fig. 1 and the partial vacuum in the chamber 23 will tend to retain the piston 27 in its inward position and consequently assist in retaining the arm 29 in position to close the motor circuit. Thus the strip feed controlling mechanism is pneumatically restrained when the circuit is closed. When an aperture or a slit in the strip registers with the detecting port 22 air may enter the chamber 23 through said aperture or slit and the port 22 and thereby relieve the partial vacuum. The pressure at both sides of the piston 27 will thereby be equalized and the pneumatic force which had previously been acting upon the arm 29 is therefore terminated. The magnet 21 not being alone of sufficient strength to retain the arm in raised position said arm swings to the right on its pivot 30 due to gravity or other force, the consequent movement of the dog 32 opening the electric circuit at the switch 19, 20 and cutting off the current from the motor and the magnet 21. The result of this action is that the strip feeding mechanism is at once arrested and the strip may be examined and the defect thus detected repaired. The operative parts may then be reset and the instrument set in operation merely by swinging the arm 29 to the left and the testing operation continues as before. As mentioned above the piston and magnet assist each other to hold the arm 29 in operative position but it will be understood that the piston may be constructed of sufficient strength to hold the arm in operative position without assistance of the magnet which may then be omitted.

In certain cases, however, it is desirable to employ both the piston and magnet actuating means for the control arm 29. Let it be assumed for example that a defect in the form of a small aperture in the film comes along to the port member 22; such aperture may pass quickly over the sealing seat of the port member so that the vacuum in the chamber 23 may be re-established since the motor 9 does not stop immediately when its control circuit is opened. Such a re-establishment of the vacuum would therefore move the arm 29 again to the left to close the motor circuit provided the piston 27 is sufficiently strong to effect this operation. The result would be that the winding mechanism would continue operation and the abnormal aperture in the film could not be mended. It is therefore desirable that the piston 27 be not sufficiently strong to move the lever 29 to the left under the conditions mentioned. In order, therefore, to hold the lever 29 in operative position the auxiliary holding or actuating magnet 21 is utilized to assist the holding action of the piston 27. With this arrangement, when the lever 29 starts its swinging movement to the right, the switch 19, 20, is opened permanently and the feeding mechanism comes to a stop.

Current to energize the circuit 17, 18, may be taken from any suitable main source. At 50 and 51 are conductors coming from a main controlled by any regular switch.

Thus by the above described construction are accomplished among others, the objects hereinbefore referred to.

Since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent, is:

1. In a strip testing instrument, in combination, strip feeding mechanism, and a pneumatic detector including detecting mechanism and a port member with a sealing seat adapted to engage in sliding contact with the strip at normally imperforate parts thereof, and a pneumatic connection between said detecting mechanism and said sealing seat and being operable alone to effect control of said detecting mechanism.

2. In a strip testing instrument, in combination, strip feeding mechanism, and a detector including a port member with a sealing seat adapted to engage in sliding contact with the strip at normally imperforate parts thereof, and being operable to detect imperfections in said imperforate parts, a driving motor for said feeding mechanism, mechanism for controlling said driving motor, and a pneumatic connection between said motor controlling mechanism and said sealing seat and being operable alone to effect control of said motor.

3. In a strip testing instrument, in combination, strip feeding mechanism and a pneumatic detector including a plurality of port members having sealing seats adapted to engage in sliding contact with imperforate parts along each longitudinal margin of the strip and being operable to detect imperfections in said imperforate parts.

4. In apparatus of the character described, in combination, strip feeding mechanism including an electric motor, a pneumatic detector adapted to slidably engage with the strip at opposite marginal parts thereof, strip feed controlling mechanism including a switch for opening and closing the circuit to said motor, means operatively connected to said detector for actuating said switch to open said circuit, and means including an electromagnet, energized and deenergized through said switch, for holding said switch closed.

5. In apparatus of the character described, in combination, strip feeding mechanism including an electric motor, a pneumatic detector adapted to cooperate with the strip, strip feed controlling mechanism including a switch for opening and closing the circuit to said motor, means operatively connected to said detector for actuating said switch to open said circuit, and means including an electromagnet, energized and deenergized through said switch, for holding said switch closed, said controlling mechanism including an arm automatically movable to open said circuit.

6. In a strip testing instrument, in combination, strip feeding mechanism, and a detector including a port member with a sealing seat adapted to engage in sliding contact with the strip at normally imperforate parts thereof, and being operable to detect imperfections in said imperforate parts, a driving motor for said feeding mechanism, mechanism for controlling said driving motor, a pneumatic connection between said motor controlling mechanism and said sealing set and being operable alone to effect control of said motor, and a pneumatic pump in pneumatic communication with said detector and driven by said motor.

7. In a strip testing instrument, in combination, strip feeding mechanism, a pneumatic detector including a chamber having a detecting port adapted to cooperate with the strip, a pneumatic pump operatively communicating with said chamber, a piston open to the pressure in said chamber and a feed mechanism controller member operatively connected to said piston.

8. In a strip testing instrument, in combination, strip feeding mechanism including an electric motor, a chamber having a detecting port adapted to cooperate with the strip, a pneumatic pump driven from said motor operatively communicating with said chamber, a piston open to the pressure in said chamber, an electric circuit for said motor, an electro-magnet in said circuit, an arm movable to open and close said circuit, and connections whereby movement of said piston moves said arm, and vice versa, said arm having an armature arranged to be held by said electro-magnet when said circuit is closed.

9. In a strip testing instrument, in combination, strip feeding mechanism including an electric motor, a chamber having a detecting port adapted to cooperate with the strip, a pneumatic pump driven from said motor operatively communicating with said chamber, a piston open to the pressure in said chamber, an electric circuit for said motor having normally open terminals, an electro-magnet in said circuit, a pivoted arm having a dog to cooperate with said terminals and having an armature to cooperate with said magnet, and a rod operatively connecting said piston and said arm.

10. A strip testing instrument including, in combination, strip feeding mechanism including a motor, a pneumatic detector adapted to cooperate with the strip, and a pneumatically restrained strip feeding mechanism controller.

11. In a strip testing instrument, in combination, strip feeding mechanism, a driving motor for said strip feeding mechanism, control mechanism for said driving motor, pneumatic actuating means under the control of a strip being tested for actuating said motor control mechanism, and auxiliary actuating means for said motor control mechanism actuated upon operation of said pneumatic actuating means.

In testimony whereof I affix my signature.

MAXWELL VIDAVER.